United States Patent
Mohanta et al.

(10) Patent No.: US 10,645,107 B2
(45) Date of Patent: May 5, 2020

(54) SYSTEM AND METHOD FOR DETECTING AND CLASSIFYING MALWARE

(71) Applicant: Cyphort Inc., Santa Clara, CA (US)

(72) Inventors: Abhijit Mohanta, Mayurbhanj (IN); Anoop Wilbur Saldanha, Mangalore (IN)

(73) Assignee: Cyphort Inc., Santa Clara, CA (US)

( * ) Notice: Subject to any disclaimer, the term of this patent is extended or adjusted under 35 U.S.C. 154(b) by 201 days.

(21) Appl. No.: 15/872,187

(22) Filed: Jan. 16, 2018

(65) Prior Publication Data

US 2018/0212988 A1 Jul. 26, 2018

(30) Foreign Application Priority Data

Jan. 23, 2017 (IN) .............................. 201711002525

(51) Int. Cl.
*H04L 29/06* (2006.01)
*G06F 9/455* (2018.01)
*G06N 20/00* (2019.01)
*G06F 21/56* (2013.01)

(52) U.S. Cl.
CPC ...... *H04L 63/1425* (2013.01); *G06F 9/45504* (2013.01); *G06F 21/566* (2013.01); *G06N 20/00* (2019.01); *H04L 63/0209* (2013.01); *H04L 63/1441* (2013.01)

(58) Field of Classification Search
CPC ............. H04L 63/1425; H04L 63/1441; H04L 63/0209; G06N 20/00; G06F 9/45504; G06F 21/566; G06F 21/56
See application file for complete search history.

(56) References Cited

U.S. PATENT DOCUMENTS

| | | | | |
|---|---|---|---|---|
| 9,690,936 | B1* | 6/2017 | Malik | G06F 21/562 |
| 10,284,575 | B2* | 5/2019 | Paithane | G06F 21/6218 |
| 2010/0077481 | A1* | 3/2010 | Polyakov | G06F 21/552 |
| | | | | 726/24 |
| 2010/0115621 | A1* | 5/2010 | Staniford | H04L 63/1416 |
| | | | | 726/25 |
| 2010/0132038 | A1* | 5/2010 | Zaitsev | G06F 21/552 |
| | | | | 726/22 |
| 2013/0227691 | A1* | 8/2013 | Aziz | H04L 63/145 |
| | | | | 726/24 |
| 2015/0227742 | A1* | 8/2015 | Pereira | G06F 21/56 |
| | | | | 726/24 |
| 2015/0244730 | A1* | 8/2015 | Vu | G06F 21/561 |
| | | | | 726/24 |

(Continued)

OTHER PUBLICATIONS

Kevin A. Roundy and Barton P. Miller, "Binary-Code Obfuscations in Prevalent Packer Tools," ACM Computing Surveys, vol. 46, No. 1, Oct. 1, 2013, 24 pages.

(Continued)

*Primary Examiner* — Matthew Smithers
(74) *Attorney, Agent, or Firm* — Harrity & Harrity, LLP

(57) ABSTRACT

A network device may include a memory and one or more processors configured to analyze execution of suspicious data; detect one or more states of execution of the suspicious data; determine that the one or more states of execution are to be assigned a priority level; and extract at least a portion of the suspicious data from one or more locations based on determining that the one or more states of execution are to be assigned a priority level.

20 Claims, 4 Drawing Sheets

(56) References Cited

U.S. PATENT DOCUMENTS

2015/0286820 A1* 10/2015 Sridhara ............... G06F 21/566
   726/23
2016/0241573 A1* 8/2016 Mixer ................. H04L 63/1416
2018/0025157 A1* 1/2018 Titonis ................... G06F 21/56
   726/24

OTHER PUBLICATIONS

Extended European Search Report corresponding to EP 18 15 3061, dated May 11, 2018, 8 pages.

* cited by examiner

SYSTEM AND METHOD FOR DETECTING AND CLASSIFYING MALWARE

RELATED APPLICATION

This application claims priority under 35 U.S.C. § 119 to Indian Patent Application No. 201711002525, filed on Jan. 23, 2017, the content of which is incorporated by reference herein in its entirety.

BACKGROUND

As computer networks grow and the amount of data stored on computers and databases interconnected by those networks grows, so have attempts to gain unauthorized access to these computers and databases. Such attempts to gain unauthorized access to computers and databases may include methodical reconnaissance of potential victims to identify traffic patterns and existing defenses. One technique used to gain unauthorized access to computers and databases includes loading malicious software or malware onto a computer. Such malware is designed to disrupt computer operation, gather sensitive information, or to grant access to unauthorized individuals.

As the awareness of malware increases, the techniques used by malware to avoid detection have grown more sophisticated. These sophisticated techniques include armoring techniques, such as encryption or packing the malware so that the malware cannot be detected or analyzed. Further, the techniques used by sophisticated malware also include evasive techniques to detect antivirus products and analysis tools. Once the malware detects the use of these antivirus products or analysis tools, the malware remains armored to defeat analysis and classification by current security systems.

As a result, some security solutions may fail to detect sophisticated malware. And, the failure to detect malware on a computer or network can result in loss of high value data, downtime or destruction of infected computers and/or the networks, lost productivity, and a high cost to recover and repair the infected computers and/or networks.

SUMMARY

A device may include one or more memories; and one or more processors, communicatively coupled to the one or more memories, to: analyze execution of suspicious data; detect one or more states of execution of the suspicious data; determine that the one or more states of execution are to be assigned a priority level; and extract at least a portion of the suspicious data from one or more locations based on determining that the one or more states of execution are to be assigned a priority level.

A method may include analyzing, by a device, execution of suspicious data; detecting, by the device, one or more states of execution of the suspicious data; determining, by the device, that the one or more states of execution are to be assigned a priority level; and extracting, by the device, at least a portion of the suspicious data from one or more locations based on determining that the one or more states of execution are to be assigned a priority level.

A non-transitory computer-readable medium may store instructions, the instructions including one or more instructions that, when executed by one or more processors, cause the one or more processors to: analyze execution of suspicious data; detect one or more states of execution of the suspicious data; determine that the one or more states of execution are to be assigned a priority level that indicates that a portion of the suspicious data is to be extracted or removed; and extract or remove the portion of the suspicious data from one or more locations based on determining that the one or more states of execution are to be assigned a priority level.

DETAILED DESCRIPTION

The following detailed description of example implementations refers to the accompanying drawings. The same reference numbers in different drawings may identify the same or similar elements.

Sophisticated malware uses defensive techniques to evade detection and classification. For example, the malware may be encrypted or packed, which requires decrypting or unpacking, to allow a system to analyze the malware for classifying the malware to enable detection. Moreover, the malware can use evasive techniques that disguise the malware from tools that implement techniques to detect and classify the malware.

Implementations described herein analyze the execution of malware to detect triggers, such as states of execution of the malware, that likely indicate that at least a portion of the malware is unpacked by the malware itself. Based on detection of the triggers, such as a specific state of execution of the malware, implementations described herein extract at least a portion of the unpacked malware from the memory for further analysis and classification, which may provide information for detection in other systems. Thus, the implementations described herein may not require knowledge of the packing or encryption techniques used by any malware.

Implementations described herein provide advantages over antivirus systems that attempt to unpack the malware using techniques to target known packers. Over time, the number of packers and protectors have increased, which requires the antivirus system to include a large number of algorithms needed to pack or unpack different variants of malware. This may be difficult or impossible. Further, employing a large number of algorithms to unpack malware requires costly hardware and significant processing resources. Moreover, the techniques used by malware to evade detection are always changing.

Thus, implementations described herein overcome these problems and avoid detection by the malware to reduce the cost and time required to analyze and classify malware. Further, implementations described herein are configured to extract and analyze a portion of the malware which may or may not be fully unpacked, which eliminates the requirement to fully unpack malware for proper classification. And, implementations described herein have a higher probability of extracting the decrypted or unpacked malware for analysis than systems that use techniques to target known malware packers.

Figure 1:
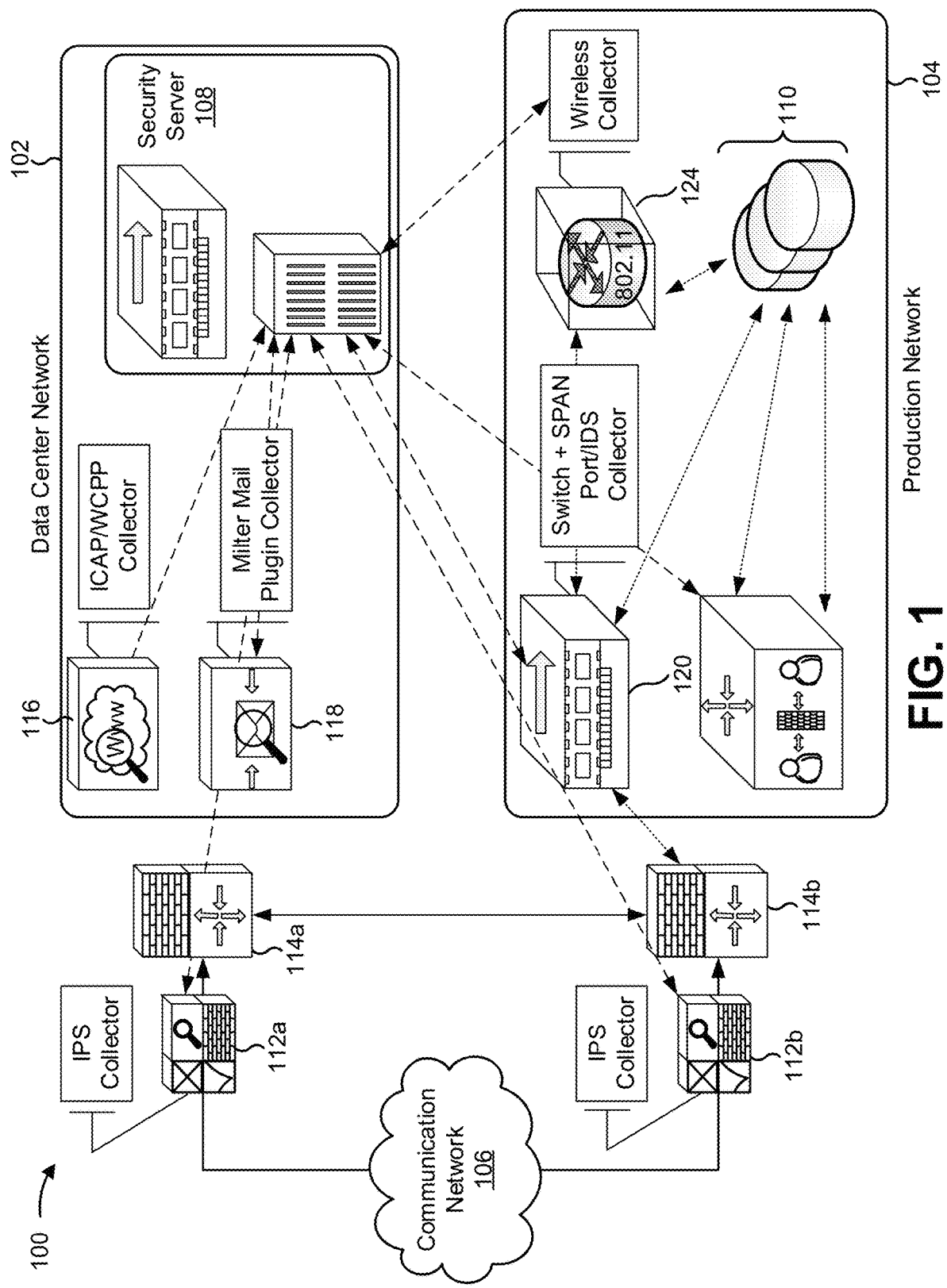
FIG. 1 is a diagram of an environment in which example implementations, described herein, may be implemented.

FIG. 1 is a diagram of an environment 100 in which example implementations, described herein, may be implemented. Systems and methods embodied in the environment 100 may implement one or more of behavior determination, machine-learning based classification models to identify a malware object, algorithms to perform behavior traces of the malware object to select one or more persistent artifacts from the infection of malware on a target system, transformation of one or more persistent artifacts into a form that can be used to verify and detect infection by this malware of a number of endpoint systems with different operating systems and software versions, detection of one or more states of execution of malware, and extraction of at least a portion of unpacked malware from memory for analysis.

Figure 3:
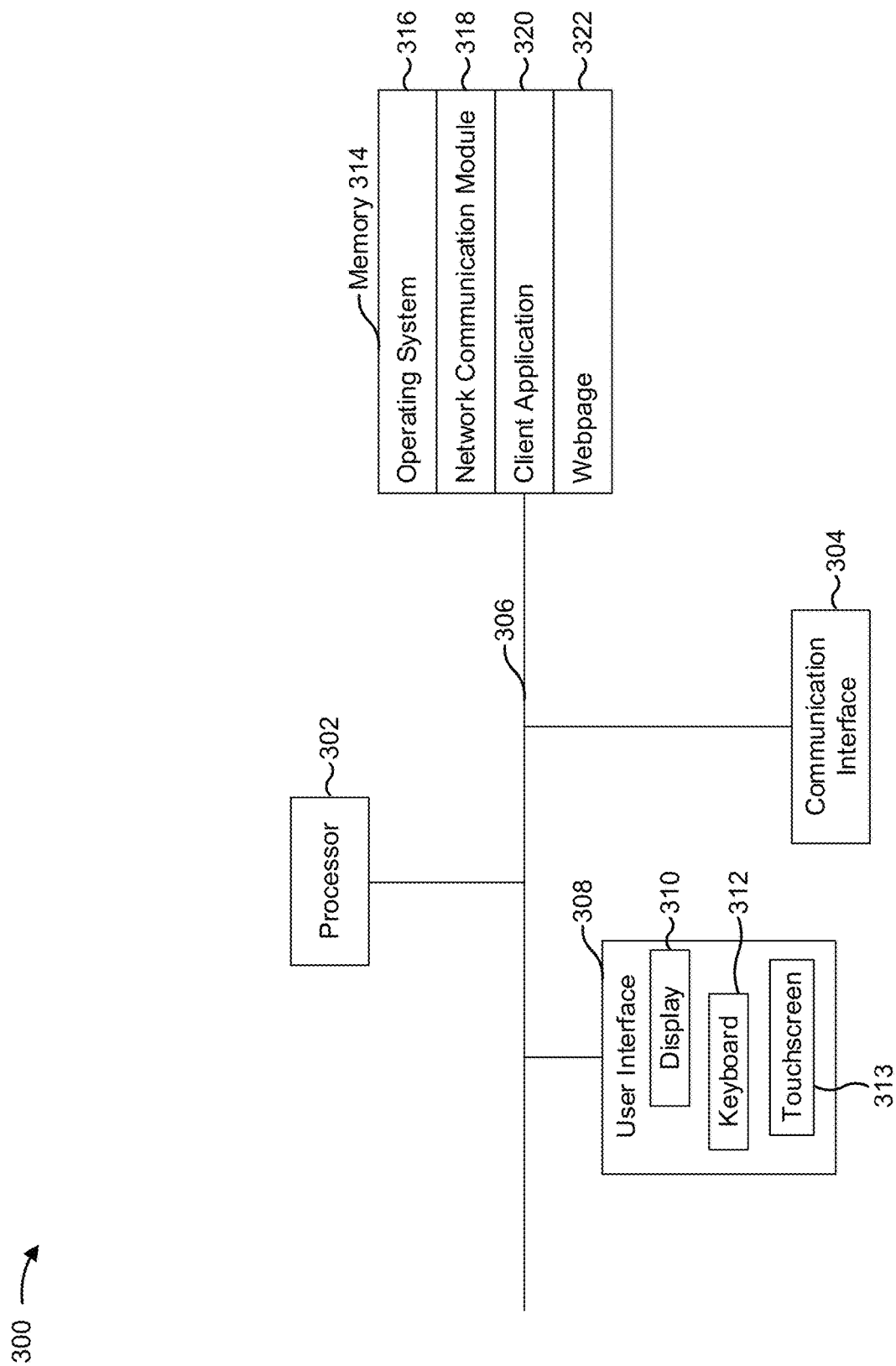
FIG. 3 is a diagram of example components/modules/means of a device.

The environment 100 includes a data center network 102 and a production network 104 that communicate over a communication network 106. The data center network 102 includes a security server 108. The production network 104 includes a plurality of end user devices 110. The security server 108 and the end user devices 110 may include digital devices. A digital device is any device with a processor and memory. An embodiment of a digital device is depicted in FIG. 3 and/or FIG. 4.

The security server 108 is a digital device configured to identify malware and/or suspicious behavior by running one or more of physical, virtualized, or emulated environments and monitoring behavior of suspicious data within the physical, virtualized, or emulated environments. The security server 108 may be configured to implement one or more aspects of the malware detection and classification system including those described herein. In various embodiments, the security server 108 receives suspicious data or malware from one or more data collectors. The one or more data collectors may be resident within or in communication with network devices such as Intrusion Prevention System (IPS) collectors 112a and 112b, firewalls 114a and 114b, ICAP/WCCP collectors 116, milter mail plug-in collectors 118, switch collectors 120, and/or access points 124. Those skilled in the art will appreciate that a collector and a network device may be two separate digital devices.

In various embodiments, data collectors may be at one or more points within the communication network 106. A data collector, which may include a tap or span (e.g., span port IDS at switch 120) and/or the like, may be configured to intercept network data from a network. The data collector is configured to identify suspicious data. Suspicious data may include any data collected by the data collector that has been flagged as suspicious by the data collector and/or any data that is to be processed within one or more of a physical, an emulated, and/or a virtualized environment.

The data collectors, for various embodiments, are configured to filter the data before flagging the data as suspicious and/or providing the collected data to the security server 108. For example, the data collectors are configured to filter out plain text but collect executables or batches. Further, in various embodiments, the data collectors are configured to perform intelligent collecting. For example, the data collectors may hash data and compare the hash to a whitelist. The whitelist may identify data that is safe. In one example, the whitelist may identify digitally signed data or data received from a known trusted source as safe. Additionally, or alternatively, the whitelist may identify previously received information that has been determined to be safe. If data has been previously received, tested within the environments, and determined to be sufficiently trustworthy, the data collector is configured to allow the data to continue through the network. Those skilled in the art will appreciate that the data collectors (or agents associated with the data collectors) are configured to be updated by the security server 108 to help the data collectors recognize sufficiently trustworthy data and to take corrective action (e.g., quarantine and alert an administrator) if untrustworthy data is recognized. In some embodiments, if data is not identified as safe, the data collectors are configured to flag the data as suspicious for further assessment.

One or more agents or other modules may monitor network traffic for particular behaviors and may configure a data collector to collect data when data is directed in a manner that falls outside normal parameters. For example, an agent may determine that a digital device has been deactivated, that a particular digital device does not typically receive any data, or that data received by a particular digital device typically comes from a particular source. If data is directed to a digital device in a manner that is not typical, the data collector may flag such data as suspicious and provide the suspicious data to the security server 108.

A network device may include any device configured to receive and/or provide data over a network. Examples of network devices include, but are not limited to, a digital device, a router, a bridge, a security device, a firewall, a web server, a mail server, a wireless access point (e.g., a hotspot, a base station, a mesh network node, etc.), a switch, a hub, and/or the like. In some embodiments, IPS collectors 112a and 112b, firewalls 114a and 114b, Internet content adaptation protocol (ICAP)/web cache communication protocol (WCCP) servers 116, devices including milter mail plug-ins 118, switches 120, and/or access points 124 may be network devices. The IPS collectors 112a and 112b may include any anti-malware device, such as an IPS system, an intrusion detection and prevention system (IDPS), or any other network security appliance. The firewalls 114a and 114b may include software and/or hardware firewalls. In some embodiments, the firewalls 114a and 114b are embodied within routers, access points, servers (e.g., web servers), or appliances.

ICAP/WCCP servers 116 include any web server or web proxy server configured to provide access to a network and/or the Internet. Network devices including milter mail plug-ins 118 may include any server or device (e.g., a mail server, etc.) that provides mail and/or filtering functions. A network device including a milter mail plug-in 118 may include a digital device that implements milter, mail transfer agents (MTAs), sendmail, and/or postfix, for example. Switches 120 include any switch or router. In some examples, the data collector may be implemented as a TAP, SPAN port, and/or IDS. Access points 124 include any device configured to provide wireless connectivity with one or more other digital devices.

The production network 104 is any network that allows one or more end user devices 110 to communicate over the communication network 106. The communication network 106 is any network that may carry data (e.g., encoded, compressed, and/or otherwise) from one digital device to another. In some examples, the communication network 106 may comprise a local area network (LAN) and/or a wide area network (WAN). The communication network 106 may comprise any number of networks. In some embodiments, the communication network 106 is the Internet, a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, a fiber optic-based network, a cloud computing network, or the like, and/or a combination of these or other types of networks. In some aspects, the production network 104 and the communication network 106 may be the same network, or one of the networks may be included in the other.

FIG. 1 is provided by way of example and does not limit systems and methods described herein only those technologies depicted. For example, data collectors may be implemented in any web or web proxy server and are not limited to servers that implement ICAP and/or WCCP. Similarly, collectors may be implemented in any mail server and are not limited to mail servers that implement milters. Data collectors may be implemented at any point in one or more networks.

Although FIG. 1 depicts a limited number of digital devices, collectors, routers, access points, and firewalls, there may be any kind and number of devices in environment 100. For example, there may be any number of security servers 108, end user devices 110, IPS collectors 112a and 112b, firewalls 114a and 114b, ICAP/WCCP collectors 116, milter mail plug-ins 118, switches 120, and/or access points 124. Further, there may be any number of data center networks 102 and/or production networks 104.

For various embodiments, a security server is configured to analyze the execution of malware. Further, the security server is configured to detect one or more states of execution of the malware. Based on a determination that the one or more states of execution are to be assigned a priority level, the security server may extract some or all of the available malware from one or more locations of a memory used for the execution of the malware. In addition, the security server can analyze the extracted portions of malware using heuristics and/or machine learning.

As indicated above, FIG. 1 is provided merely as an example. Other examples are possible and may differ from what was described with regard to FIG. 1. The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100. Furthermore, the terms "network device" and "digital device" may be used interchangeably herein. In some implementations, a network device (e.g., digital device) may be a physical device implemented within a housing, such as a chassis. In some implementations, a network device may be a virtual device implemented by one or more computer devices of a cloud computing environment or a data center.

Figure 2:
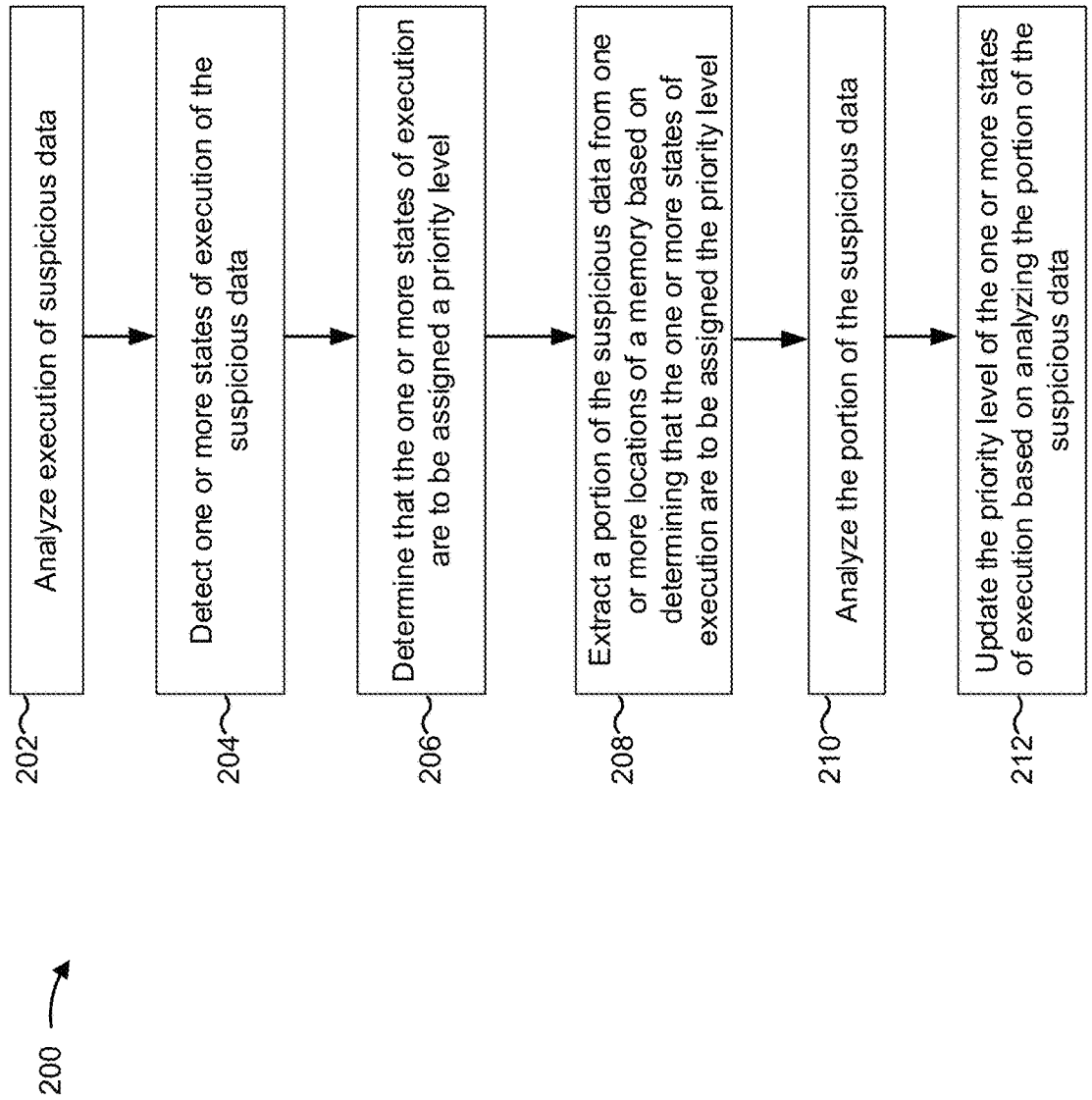
FIG. 2 is a flow chart of an example process for detecting malware using a security server.

FIG. 2 is a flow chart of an example process 200 for detecting malware using a security server. In some implementations, one or more process blocks of FIG. 2 may be performed by a security server (e.g., security server 108, system 402, etc.). In some implementations, one or more process blocks of FIG. 2 may be performed by another device or a group of devices separate from or including the security server, such as an IPS collector, a firewall, an ICAP/WCCP server, a milter mail plug-in, a switch, an access point, and/or the like.

As shown in FIG. 2, process 200 may include analyzing the execution of suspicious data (block 202). For example, the security server analyzes the execution of malware (e.g., suspicious data, a malware executable, etc.) by executing the malware in one or more of a physical environment, an emulated environment, or a virtualized environment. In FIG. 2 and elsewhere herein, "suspicious data" may be used interchangeably with "malware." The security server is configured to monitor the behavior of the malware in, for example, one or more of the physical environment, the emulated environment, or the virtualized environment to analyze the execution of the malware to determine one or more states of execution of the malware. A state of execution of the malware includes, but is not limited to, an application programming interface (API) call, a parameter passed to an API, a stateful condition, a non-stateful condition, and/or other indications of the state of execution including those known in the art. A stateful condition includes, but is not limited to, a particular sequence of API calls that have been executed. A non-stateful condition includes, but is not limited to, presence of strings that were previously not present in memory (in the case of a packed malware), presence of strings that are human readable which were previously not present in memory (in the case of a packed malware), presence of strings that indicate that malware is attempting to detect security tools and/or attempting to detect whether the current environment is virtual for example vmware or vbox related strings, presence of a string that indicates a family of malware (e.g., a Cerber ransomware may have a string in a format similar to "CERBER_CORE_PROTECTION_MUTEX" that may indicate that the binary under inspection belongs to the Cerber family of malware) and/or other indicators.

As further shown in FIG. 2, process 200 may include detecting one or more states of execution of the suspicious data (block 204). For example, security server is configured to detect one or more API calls that indicate that a portion of or all of the malware is unpacked in memory. The security server, for various embodiments, is configured to detect a series of states of execution of the malware. For example, the security server may be configured to detect two or more API calls in a sequence of API calls. In some implementations, the security server may be configured to detect an API call and one or more parameters passed in one or more API calls.

As further shown in FIG. 2, process 200 may include determining that the one or more states of execution are to be assigned a priority level (block 206). The security server maps one or more states of execution that have been triggered and identified in the malware execution, to a particular priority level, and based on a set of predetermined priority levels, it figures out the likelihood that for the identified priority level, the current state of malware is not unpacked or partially unpacked or fully unpacked. For example, a single state of execution may indicate that malware has unpacked a portion of or all of the malware into memory. For some embodiments, a security server may store or have access to a priority list identifying one or more states of execution to detect a state of execution or a series of one or more states of execution that indicate that at least a portion of malware is likely unpacked in memory. If the state of execution or series of one or more states of execution are identified by the priority list, the security server determines that the one or more states of execution are assigned a priority level. The priority level, according to some embodiments, is used as an indicator of the likelihood that the binary of a packed malware is unpacked. For example, the greater the determined priority level of the state of execution of a malware, the more likely the malware is unpacked.

As further shown in FIG. 2, process 200 may include extracting a portion of the suspicious data from one or more locations of a memory based on determining that the one or more states of execution are to be assigned the priority level (block 208). For example, the security server may extract some or all of the available malware from one or more locations of a memory used for the execution of the malware. Examples of states of execution associated with a higher priority level include, but are not limited to, an API call OpenProcess( ), httpSendRequest, other communication level APIs, including network and internet communication APIS, and/or other processes spawned by the use of process creation APIs like CreateProcess( ) when a malware is unpacked (e.g., completely or partially) and injected into other processes. Examples of states of execution associated with a lower priority level include APIs like VirtualProtect( ) and VirtualAlloc( ), which may nor may not be called when a malware is unpacked. Further, the security server, for various embodiments, may be configured to use a priority list that identifies one or more states of execution that may have at least a portion of the malware unpacked in a memory. Further, the security server is configured to target a memory region where at least a portion of a malware is unpacked based on the one or more states (e.g., based on information in a priority list). In some implementations, the priority list can be updated dynamically to include states of execution and/or memory regions not currently on the priority list. For example, the priority list may be updated with additional information to extract for states of execution already on the priority list.

For various embodiments, the security server is configured to extract at least a portion of virtual memory of the main memory module used by the malware based on the one or more states of execution. The security server, for some embodiments, is configured to extract at least a portion of the virtual memory that is not in the main memory module used by malware. For example, the security server is configured to extract memory allocated using VirtualAlloc( ). Extracting at least a portion of the malware provides the ability to analyze the malware for one or more strings related to and/or generated by the malware, rather than analyzing the memory of supporting modules, libraries, and files, which are not as useful to classify the malware. This also provides detection and analysis of malware strains that unpack themselves into a memory region outside the main processing module.

For example, at least a portion of virtual memory may include information to determine memory locations in a memory that stores the malware or a portion thereof. Further, the analysis of one or more strings of the virtual memory (e.g., the malware), using techniques described herein, provides the ability to discover evasive techniques used by a malware by, for example, extracting a name of an antivirus vendor, a virtual machine name, a security tool, and other indicators that the malware may attempt to evade discovery. In addition, extracting the malware provides the ability to analyze one or more strings related to the malware including, but not limited to, one or more uniform resource locators (URLs), one or more Internet protocol (IP) addresses, and/or the like. The detected one or more URLs and/or IP addresses can be compared to a white list, a black list, and/or another list to determine an origin and/or help classify the malware based on known malware families. Thus, the malware detection and classification system according to embodiments described herein improves classification of malware and is configured to detect malware irrespective of whether the malware is initially packed.

Because the security server is configured to extract at least a portion of malware from one or more memory locations based on one or more states of execution during execution of the malware, the security server may extract at least a portion of the malware code before the malware terminates prematurely in an attempt to avoid detection. The security server can analyze the extracted portion to fill in any gaps of knowledge of traces from the dynamic execution of malware. For example, static analysis of one or more portions of the malware can be used to classify the malware, which can be used to generate better detection measures.

As further shown in FIG. 2, process 200 may include analyzing the portion of the suspicious data (block 210). For example, the security server may be configured to use a machine learning technique to analyze the suspicious data to determine that the suspicious data corresponds to a detected random name or names that malware may use to evade detection. Similarly, the security server, for various embodiments, may be configured to extract and verify domains generated by a malware's domain generation algorithm (DGA) using machine learning.

As further shown in FIG. 2, process 200 may include updating the priority level of the one or more states of execution based on analyzing the portion of the suspicious data (block 212). For example, the security device may update a priority list used to determine whether suspicious data should be extracted (e.g., whether one or more states should be assigned a priority level). Additionally, or alternatively, the priority list may be updated with additional information to extract for states of execution already on the priority list. In one example, the security server may provide new entries for a whitelist, new entries for a blacklist, heuristic algorithms, statistical algorithms, updated rules, and/or new signatures to assist in determining if network data is suspicious. The whitelists, entries for whitelists, blacklists, entries for blacklists, heuristic algorithms, statistical algorithms, and/or new signatures may be generated by one or more security servers. Additionally, or alternatively, the security server may generate or update signatures for the suspicious data, generate or update heuristics or statistics for malware detection, and/or generate a report identifying targeted information (e.g., credit card numbers, passwords, personal information, etc.). In some implementations, the security server updates a priority level of one or more states of execution.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

FIG. 3 is a diagram of example components/modules/means of a device 300. Device 300 may include a client device, user device, client machine, digital device, or network device that includes a processor 302, one or more network or other communication interfaces 304, a memory 314, and one or more communication buses 306 for interconnecting the one or more processors 302, the one or more network or other communication interfaces 304, and the memory 314. The device 300 may include a user interface 308 comprising a display device 310, a keyboard 312, a touchscreen 313, and/or other input/output device. Memory 314 may include one or more memories, such as a non-transitory computer readable medium. For example, memory 314 may include high speed random access memory, non-volatile memory, such as one or more magnetic or optical storage disks, and/or the like. The memory 314 may include mass storage that is located remote from processor 302. Moreover, memory 314, or alternatively one or more storage devices (e.g., one or more non-volatile storage devices or non-transitory computer-readable medium) within memory 314, includes a computer-readable storage medium. The memory 314 may store the following elements, or a subset or superset of such elements:

- an operating system 316 that includes procedures for handling various basic system services and for performing hardware dependent tasks;
- a network communication module 318 (or instructions) that is used for connecting the device 300 to other computers, clients, servers, systems or devices via the one or more network or other communication interfaces 304 and one or more communications networks, such as the Internet, other wide area networks, local area networks, metropolitan area networks, and other type of networks;
- a client application 320 including, but not limited to, a web browser, a document viewer or other application for viewing information; and
- a webpage 322 including one generated by the client application 320 configured to receive a user input to communicate across a network with other computers or devices.

As indicated above, FIG. 3 is provided merely as an example. Other examples are possible and may differ from what was described with regard to FIG. 3.

Figure 4:
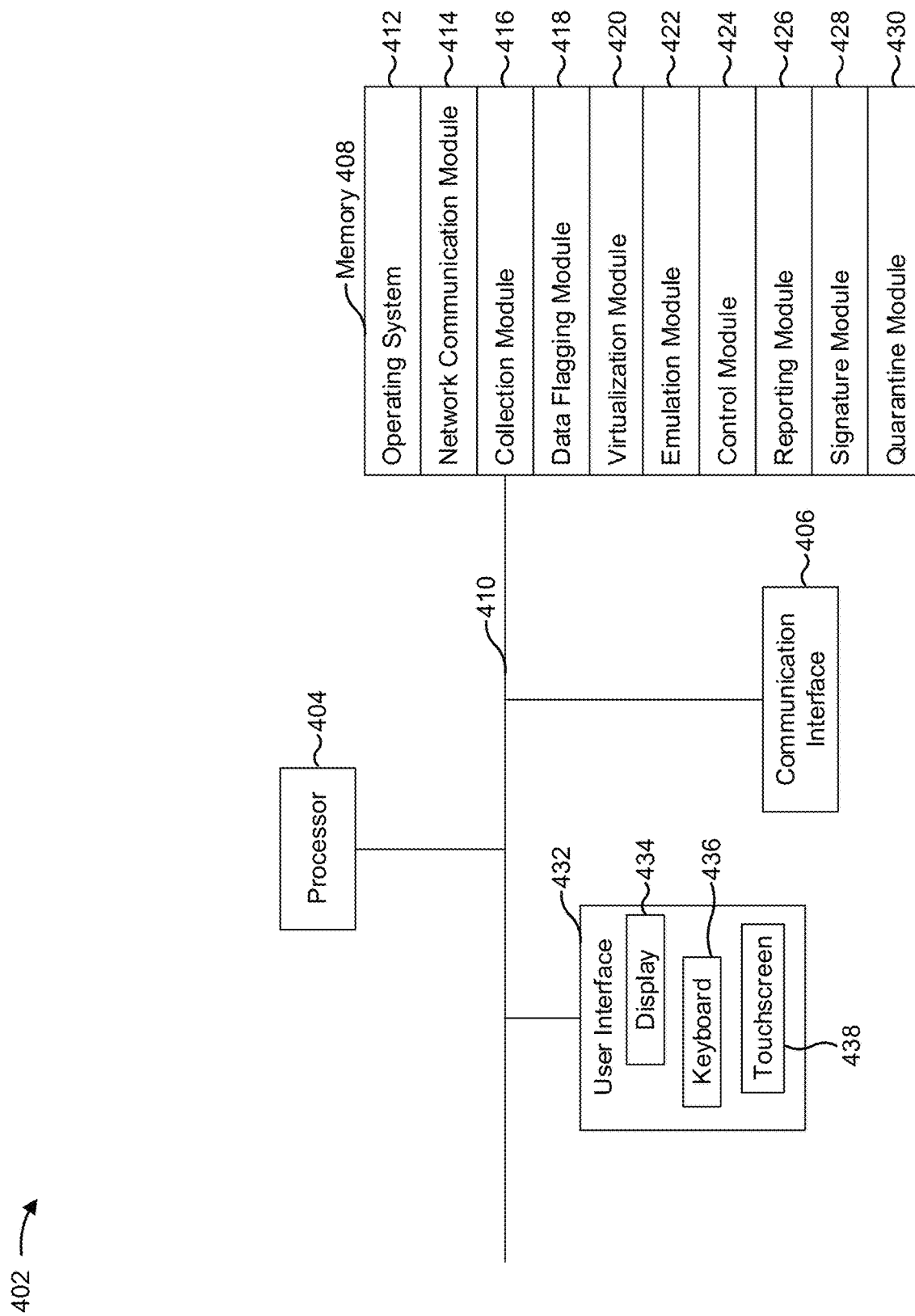
FIG. 4 is a diagram of example components/modules/means of a system that may implement the implementations described herein.

FIG. 4 is a diagram of example components/modules/means of a system 402 that may implement the implementations described herein. The system 402, according to an embodiment, includes a processor 404, a communication interface 406, a memory 408, and one or more communication buses 410 for interconnecting components of system 402. For example, system 402 may include one or more components of device 300. The system 402 may optionally include a user interface 432 comprising a display device 434, a keyboard 436, a touchscreen 438, and/or other input/output devices. Memory 408 may include high speed random access memory. In some implementations, memory 408 may include non-volatile memory, such as one or more magnetic or optical storage disks. The memory 408 may include mass storage that is remotely located from processor 404. Moreover, memory 408, or alternatively one or more storage devices (e.g., one or more nonvolatile storage devices) within memory 408, includes a computer readable storage medium and/or a non-transitory computer-readable medium. The memory 408 may store one or more of the following elements: an operating system 412, a network communication module 414, a collection module 416, a data flagging module 418, a visualization module 420, an emulation module 422, a control module 424, a reporting module 426, a signature module 428, and a quarantine module 430. The operating system 412 includes procedures for handling various basic system services and for performing hardware dependent tasks. The network communication module 414 may be used for connecting the system to other computers, clients, peers, systems or devices via the one or more communication interfaces 406 and one or more communication networks, such as the Internet, other wide area networks, local area networks, metropolitan area networks, and other type of networks.

The collection module 416 may inspect objects for potentially malware-carrying objects. Further, the collection module 416 is configured to receive or collect network data (e.g., potentially suspicious data) from one or more sources. Network data may include data that is provided on a network from one digital device to another. The collection module 416 may flag the network data as suspicious data based on, for example, white lists, black lists, heuristic analysis, statistical analysis, rules, and/or atypical behavior. In some embodiments, the sources comprise data collectors configured to receive network data. For example, firewalls, IPS servers, routers, switches, access, points, and/or the like may function as or include a data collector. The data collector may forward network data to the collection module 416.

In some embodiments, the data collectors filter the data before providing the data to the collection module 416. For example, the data collector may be configured to collect or intercept only data that includes executables, batch files, and/or the like. In some embodiments, the data collector may be configured to follow configured rules. For example, if data is directed between two known and trustworthy sources (e.g., the data is communicated between two devices on a whitelist), the data collector may not collect the data. In various embodiments, a rule may be configured to intercept a class of data (e.g., all MS Word documents that may include macros or data that may comprise a script). In some embodiments, rules may be configured to target a class of attack or payload based on the type of malware attacks on the target network in the past. In some embodiments, the system may make recommendations (e.g., via the reporting module 426) and/or configure rules for the collection module 416 and/or the data collectors. The data collectors may comprise any number of rules regarding when data is collected or what data is collected.

In some embodiments, the data collectors located at various positions in the network may not perform any assessment or determination regarding whether the collected data is suspicious or trustworthy. For example, the data collector may collect all or a portion of the network data and provide the collected network data to the collection module 416, and the collection module 416 may perform filtering.

A data flagging module 418 (or instructions) may perform one or more assessments to the collected data received by the collection module 416 and/or the data collector to determine if the intercepted network data is suspicious. The data flagging module 418 may apply rules using techniques including those known in the art to determine if the collected data should be flagged as suspicious. In various embodiments, the data flagging module 418 may hash the data and/or compare the data to a whitelist to determine whether the data is acceptable. If the data is not associated with the whitelist, the data flagging module 418 may flag the data as suspicious.

In various embodiments, collected network data may be initially identified as suspicious until determined otherwise (e.g., associated with a whitelist) or until heuristics find no reason that the network data should be flagged as suspicious. In some embodiments, the data flagging module 418 may perform packet analysis to look for suspicious characteristics in the header, footer, destination IP, origin IP, payload, and the like. Those skilled in the art will appreciate that the data flagging module 418 may perform a heuristic analysis, a statistical analysis, and/or signature identification to determine if the collected network data is suspicious. Signature identification may involve searching for known patterns of suspicious data within the collected data's code.

The data flagging module 418 may be resident at the data collector, at the system, partially at the data collector, partially at a security server, or on a network device. For example, a router may comprise a data collector and a data flagging module 418 configured to perform one or more heuristic assessments on the collected network data. If the collected network data is determined to be suspicious, the router may direct the collected data to the security server.

In various embodiments, the data flagging module 418 may be updated. In one example, the security server may provide new entries for a whitelist, new entries for a blacklist, heuristic algorithms, statistical algorithms, updated rules, and/or new signatures to assist the data flagging module 418 to determine if network data is suspicious. The whitelists, entries for whitelists, blacklists, entries for blacklists, heuristic algorithms, statistical algorithms, and/or new signatures may be generated by one or more security servers (e.g., via the reporting module 426).

The virtualization module 420 and/or emulation module 422 may analyze suspicious data for untrusted behavior (e.g., malware, distributed attacks, detonation). The virtualization module 420 is configured to instantiate one or more virtualized environments to process and monitor suspicious data. Within the virtualized environment, the suspicious data may operate as if within a target digital device. The virtualization module 420 may monitor the operations of the suspicious data within the virtualization environment to determine whether the suspicious data is trustworthy, malware, or requires further action (e.g., further monitoring in one or more other virtualization environments and/or monitoring within one or more emulation environments). In various embodiments, the virtualization module 420 analyzes the execution of malware using techniques including those described herein. Further, the virtualization module 420 detects one or more states of execution including, but not limited to, one or more of a API call, a parameter passed to the API, a stateful condition, a non-stateful condition, a modification to a system, an outbound call, a tainted data interaction, and/or other indications of the state of execution using techniques including those described herein.

The virtualization module 420 may analyze the one or more states of execution detected to determine if the one or more states are assigned a priority level using techniques including those described herein. The virtualization module 420 is configured to extract at least a portion of malware from one or more locations of a memory, such as a virtual memory, based on a determination that the one or more states of execution of the malware are assigned to a priority level.

In some embodiments, the virtualization module 420 may flag suspicious data as requiring further emulation and analytics if the data has suspicious behavior such as, but not limited to, preparing an executable that is not executed, performing functions without result, processing that suddenly terminates, loading data into memory that is not accessed or otherwise executed, scanning ports, or checking in specific portions of memory when those locations in memory may be empty. The virtualization module 420 may monitor the operations performed by or for the suspicious data and may perform a variety of checks to determine if the suspicious data is behaving in a suspicious manner.

The emulation module 422 is configured to process suspicious data in an emulated environment using techniques similar to those described with regards to the virtualization module 420. Malware may require resources that are not available in a virtualized environment or may detect a virtualized environment. When malware requires unavailable resources, the malware may "go benign" or act in a non-harmful manner. In another example, malware may detect a virtualized environment by scanning for specific files and/or memory necessary for hypervisor, kernel, or other virtualization data to execute. If malware scans portions of an environment and determines that a virtualization environment may be running, the malware may "go benign" and either terminate or perform nonthreatening functions, thereby thwarting detection efforts.

In some embodiments, the emulation module 422 processes data flagged as behaving suspiciously by the virtualization module 420. The emulation module 422 may process the suspicious data in a bare metal environment where the suspicious data may have direct memory access. The behavior of the suspicious data as well as the behavior of the emulation environment may be monitored and/or logged to track the suspicious data's operations. For example, the emulation module 422 may track what resources (e.g., applications and/or operating system files) are called in processing the suspicious data.

A report may be generated (e.g., by the reporting module 426) describing the malware and/or identifying vulnerabilities. Additionally, or alternatively, the system 402 may generate or update signatures for the malware, generate or update heuristics or statistics for malware detection, and/or generate a report identifying the targeted information (e.g., credit card numbers, passwords, personal information, etc.). In some implementations, the reporting module 426 updates a priority level of one or more states of execution using techniques including those describe herein.

Moreover, the reporting module 426 may analyze the portion of the malware using techniques including those described herein. The reporting module 426 is configured to process the suspicious data to generate a representation of the malware, identify the vector of attack, determine the type, extent, and scope of the malware's payload, determine the target of the attack, and detect if the malware is configured to work with any other malware. In this way, the security server may extend predictive analysis to actual applications for complete validation.

A control module 424 synchronizes the virtualization module 420 and the emulation module 422. In some embodiments, the control module 424 synchronizes the virtualization and emulation environments. For example, the control module 424 may direct the virtualization module 420 to instantiate a plurality of different virtualization environments with different resources. The control module 424 may compare the operations of different virtualization environments to each other in order to track points of divergence. For example, the control module 424 may identify suspicious data as operating in one manner when the virtualization environment includes a first version of an application, but operating in a different manner when the virtualization environment includes a second version of an application (e.g., when the suspicious data exploits a vulnerability that may be present in one version of an application but not present in another version).

The control module 424 may track operations in one or more of physical environments, virtualization environments, or emulation environments. For example, the control module 424 may identify when the suspicious data behaves differently in a virtualization environment in comparison with an emulation environment. For example, control module 424 may determine that a priority level is to be assigned based on a comparison of execution of the suspicious data in a virtualized environment and in an emulated environment. Divergence and correlation analysis is when operations performed by or for suspicious data in a one virtual environment are compared to operations performed by or for suspicious data in a different virtual environment or emulation environment. For example, the control module 424 may compare monitored steps of suspicious data in a virtual environment to monitored steps of the same suspicious data in an emulation environment. In such a case, the functions or steps of or for the suspicious data may diverge. In one example, the control module 424 may detect evidence of suspicious or untrusted behavior in the emulation environment because, unlike the virtualized environment where the suspicious data went benign, the suspicious data undertakes actions that are characteristic of malware (e.g., hijacks a formerly trusted data or processes).

When divergence is detected, the control module 424 may re-provision or instantiate a virtualization environment with information from the emulation environment (e.g., a page table including state information and/or response information further described herein) that may not be previously present in the originally instantiation of the virtualization environment. The suspicious data may then be monitored in the new virtualization environment to further detect suspicious behavior or untrusted behavior. Those skilled in the art will appreciate that suspicious behavior of an object is behavior that may be untrusted or malicious. Untrusted behavior is behavior that indicates a threat to a distal device.

In some embodiments, the control module 424 is configured to compare the operations of each virtualized environment in order to identify suspicious or untrusted behavior. For example, if the suspicious data takes different operations depending on the version of a browser or other specific resource when compared to other virtualized environments, the control module 424 may identify the suspicious data as malware. Once the control module 424 identifies the suspicious data as malware or otherwise untrusted, the control module 424 may continue to monitor the virtualized environment to determine a vector of attack of the malware, a payload of the malware, and/or a target (e.g., control of the digital device, password access, credit card information access, ability to install a bot, keylogger, and/or rootkit, and/or the like). For example, the operations performed in connection with the suspicious data may be monitored in order to further identify the malware, determine untrusted acts, and log the effect or probable effect.

A reporting module 426 is configured to generate a data model based on a generated list of events. Further a reporting module 426 is configured to generate reports based on the processing of the suspicious data of the virtualization module 420 and/or the emulation module 422. In various embodiments, the reporting module 426 generates a report to identify malware, one or more vectors of attack, one or more payloads, a target of valuable data, vulnerabilities, command and control protocols, and/or behaviors that are characteristics of the malware. In some implementations, the reporting module 426 may make recommendations to safeguard information based on the attack (e.g., move credit card information to a different digital device, require additional security such as virtual private network access only, or the like) and update or add one or more states of execution to a priority list based on analyze of malware using techniques including those described herein.

In some embodiments, the reporting module 426 generates malware information that may be used to identify malware or suspicious behavior. For example, the reporting module 426 may generate malware information based on the monitored information of the virtualization environment. The malware information may include a hash of the suspicious data, a characteristic of the operations performed in connection with the suspicious data, and/or the like. In one example, the malware information may identify a class of suspicious behavior based on one or more steps being performed by or for suspicious data at specific times. As a result, suspicious data and/or malware may be identified based on the malware information without virtualizing or emulating an entire attack.

A signature module 428 is configured to store signature files that may be used to identify malware. The signature files may be generated by the reporting module 426 and/or the signature module 428. In various embodiments, the security server may generate signatures, malware information, whitelist entries, and/or blacklist entries to share with other security servers. As a result, the signature module 428 may include signatures generated by other security servers or other digital devices. The signature module 428 may include signatures generated from a variety of different sources including, but not limited to, other security firms, antivirus companies, and/or other third-parties.

In various embodiments, the signature module 428 may provide signatures that are used to determine if network data is suspicious or is malware. For example, if network data matches the signature of known malware, then the network data may be classified as malware. If network data matches a signature that is suspicious, then the network data may be flagged as suspicious data. The malware and/or the suspicious data may be processed within one or more of a physical environment, a virtualization environment, or an emulation environment as described herein.

A quarantine module 430 is configured to quarantine suspicious data and/or network data. In various embodiments, when the security server identifies malware or probable malware, the quarantine module 430 may quarantine the suspicious data, network data, and/or any data associated with the suspicious data and/or network data. For example, the quarantine module 430 may quarantine all data from a particular digital device that has been identified as being infected or possibly infected. In some embodiments, the quarantine module 430 is configured to alert a security administrator or the like (e.g., via email, call, voicemail, or text message) when malware or possible malware has been found.

As indicated above, FIG. 4 is provided merely as an example. Other examples are possible and may differ from what was described with regard to FIG. 4.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, the term module is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
analyze execution of suspicious data,
where the suspicious data is packed prior to execution;
detect one or more states of execution of the suspicious data;
determine that the one or more states of execution are to be assigned a priority level; and
extract at least a portion of the suspicious data from one or more locations based on determining that the one or more states of execution are to be assigned a priority level.

2. The device of claim 1, where the one or more states of execution include an application programming interface call.

3. The device of claim 1, where the one or more states of execution include a parameter passed to an application programming interface call.

4. The device of claim 1, where the one or more processors are further to:
assign the priority level.

5. The device of claim 4, where the one or more processors, when assigning the priority level, are to:
assign the priority level based on at last one previous state of execution of the suspicious data.

6. The device of claim 1, where the one or more processors are further to:
determine the one or more locations based on the one or more states of execution.

7. The device of claim 1, where the portion includes less than all of the suspicious data.

8. The device of claim 7, where the one or more processors, when determining that the priority level is to be assigned, are to:
determine that the priority level is to be assigned based on heuristics.

9. The device of claim 7, where the one or more processors, when determining that the priority level is to be assigned, are to:
determine that the priority level is to be assigned based on a machine learning technique.

10. The device of claim 1, where the one or more processors, when analyzing execution of the suspicious data, are to:
analyze execution of the suspicious data in a virtualized environment.

11. A method, comprising:
analyzing, by a device, execution of suspicious data,
where the suspicious data is packed prior to execution;
detecting, by the device, one or more states of execution of the suspicious data;
determining, by the device, that the one or more states of execution are to be assigned a priority level; and
extracting, by the device, at least a portion of the suspicious data from one or more locations based on determining that the one or more states of execution are to be assigned a priority level.

12. The method of claim 11, where the analyzing is performed in a virtualized environment.

13. The method of claim 11, where the determination is based on a comparison of execution of the suspicious data in a virtualized environment and in an emulated environment.

14. The method of claim 11, where the one or more states of execution include at least one of:
an application programming interface call,
a parameter associated with an application programming interface call,
a stateful condition, or
a non-stateful condition.

15. The method of claim 14, where the determination is based on information identifying priority levels and corresponding states of execution.

16. The method of claim 14, where the determination is based on at least one string of the suspicious data.

17. A non-transitory computer-readable medium storing instructions, the instructions comprising:
one or more instructions that, when executed by one or more processors, cause the one or more processors to:
analyze execution of suspicious data,
where the suspicious data is packed prior to execution;
detect one or more states of execution of the suspicious data;
determine that the one or more states of execution are to be assigned a priority level that indicates that a portion of the suspicious data is to be extracted or removed; and
extract or remove the portion of the suspicious data from one or more locations based on determining that the one or more states of execution are to be assigned a priority level.

18. The non-transitory computer-readable medium of claim 17, where the one or more instructions, that cause the one or more processors to detect the one or more states of execution, cause the one or more processors to:
detect the one or more states of execution based on a string included in the suspicious data.

19. The non-transitory computer-readable medium of claim 17, where the one or more instructions, that cause the one or more processors to determine that the one or more states of execution are to be assigned the priority level, cause the one or more processors to:
   determine that the one or more states of execution are to be assigned the priority level based on an evasive technique in connection with the suspicious data.

20. The non-transitory computer-readable medium of claim 17, where the suspicious data comprises a malware executable.

\* \* \* \* \*